United States Patent [19]

Stauffer

[11] 4,246,476
[45] Jan. 20, 1981

[54] AUTOMATIC FOCUSING APPARATUS FOR USE WITH A PLURALITY OF LENSES

[75] Inventor: Norman L. Stauffer, Englewood, Colo.

[73] Assignee: Honeywell Inc., Minneapolis, Minn.

[21] Appl. No.: 29,498

[22] Filed: Apr. 12, 1979

[51] Int. Cl.³ .................... H01J 40/14; G03B 3/10
[52] U.S. Cl. .................... 250/201; 250/209; 354/25; 354/31; 356/4
[58] Field of Search .................. 250/201, 204, 209; 354/25, 31, 195; 352/140; 356/4

[56] References Cited

U.S. PATENT DOCUMENTS

| | | | |
|---|---|---|---|
| 3,450,018 | 6/1969 | John, Jr. | 354/25 |
| 3,680,024 | 7/1972 | Tashiro et al. | 338/17 |
| 4,019,049 | 4/1977 | Schulz | 250/201 X |
| 4,060,325 | 11/1977 | Nobusawa | 354/25 |
| 4,104,651 | 8/1978 | Matsumoto et al. | 354/25 |

Primary Examiner—David C. Nelms
Assistant Examiner—Edward P. Westin
Attorney, Agent, or Firm—Charles J. Ungemach

[57] ABSTRACT

A radiation responsive detector arrangement for use with a range determination system. A first plurality of detector pairs are mounted to receive radiation from a lenslet array which produces a plurality of images of the exit pupil of a first objective lens whose f number is equal to or less than a predetermined value and a second plurality of detector pairs are mounted to receive radiation from the lenslet array which produces a plurality of images of the exit pupil of a second objective lens whose f number is greater than the predetermined value. Switch means is provided so as to use the outputs of the first plurality of detector pairs in the range determination system when the first objective lens is employed and to use the outputs of the second plurality of detector pairs in the range determination system when the second objective lens is employed.

19 Claims, 5 Drawing Figures

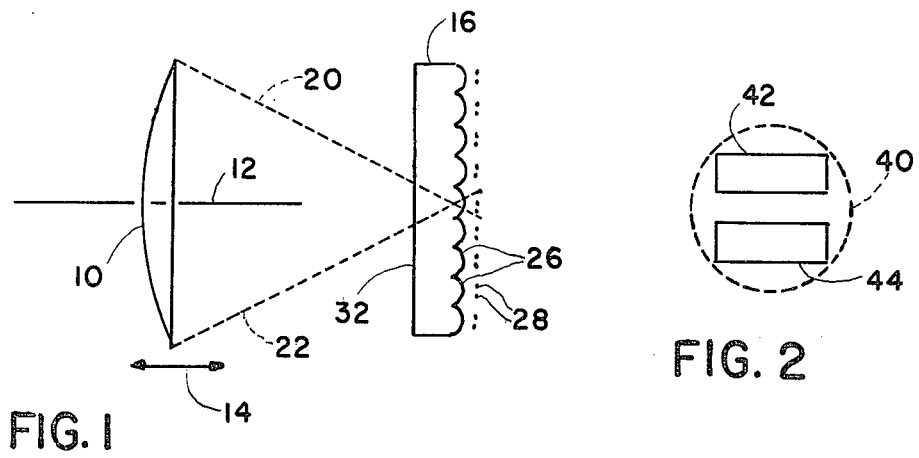
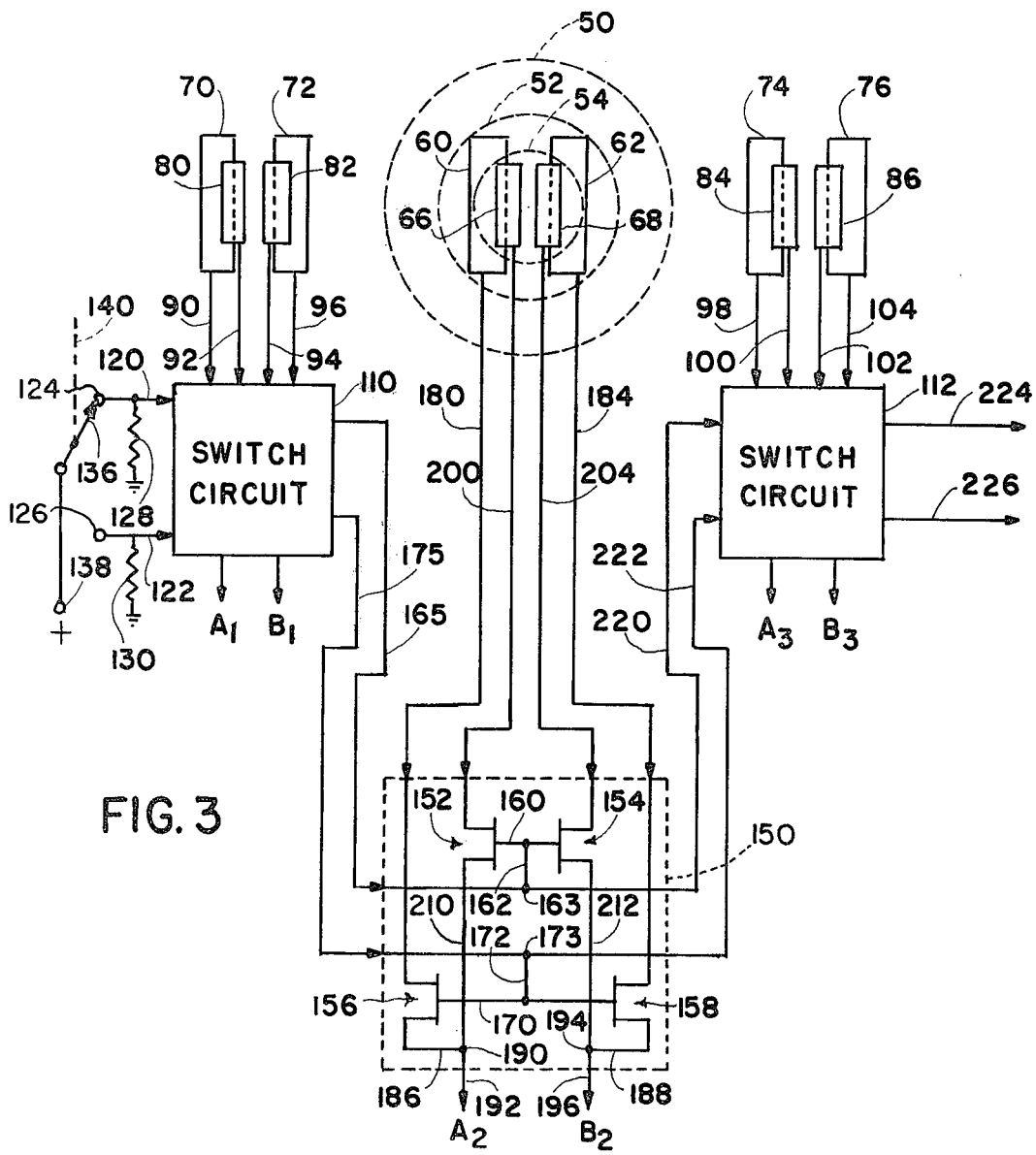

AUTOMATIC FOCUSING APPARATUS FOR USE WITH A PLURALITY OF LENSES

BACKGROUND OF THE INVENTION

The present invention relates generally to a detector arrangement for use in an optical system and more particularly to an improvement relating to the detector arrangement found in my copending application Ser. No. 912,688, filed June 5, 1978, my copending application Ser. No. 23,866, filed Mar. 26, 1979, my copending application Ser. No. 23,865, filed Mar. 26, 1979, and the copending application of Stauffer and Wilwerding Ser. No. 16,595, filed Mar. 1, 1979.

In the above-mentioned copending applications, radiation from a remote scene to be focused upon is directed by an objective lens to a plurality of lenslets mounted proximate the image of the objective lens. Each lenslet produces an image of the exit pupil of the objective lens and proximate the image plane of each lenslet is mounted a pair of radiation sensitive detectors which produce output signals usable for range determination or auto focussing of cameras. The image of the exit pupil is generally circular in nature or, in the case of the above-mentioned copending application Ser. No. 23,866, oblong or oval. It is desirable that the detectors be as large as possible to maximize the signal available for range determination but are generally rectangular for ease of production. The rectangular detectors are mounted in pairs so that they fit within the entire circular or oblong image of the exit pupil. The size of the image varies with the f number of the objective lens and since the most commonly used lenses have a maximum aperature in the range of f/1.4 to f/2.8, the size of the detectors is chosen so that they will fit entirely within the image produced by an f/2.8 lens. In some cases, however, it is desirable to uses lenses that have an f number greater than 2.8 as, for example, a telephoto lens which may have an aperture as small as f/4.0. When this occurs, the image of the objective lens pupil is smaller than the detectors and errors in detector output may occur.

SUMMARY OF THE INVENTION

The present invention provides for a detector arrangement in which two sets of detectors are employed both of which lie within the image of the exit pupil of the objective lens, but where one set of detectors is of smaller dimensions than the other. A switching arrangement is also provided so that during normal operation with lenses having an aperture of between f/1.4 and f/2.8, the larger detectors are utilized by the system but when a special lens such as a telephoto lens is used having an aperture smaller than f/2.8, the smaller set of detectors is employed. This arrangement assures that when lenses are changed the sensing detectors will lie entirely within the image of the exit pupil of the objective lens as is necessary for accurate operation of the system.

BRIEF DESCRIPTION OF THE DRAWINGS

FIG. 1 shows the objective lens, lenslet array and detectors of the above-mentioned copending applications;

FIG. 2 shows the image produced by one of the lenslets of FIG. 1 with the detectors mounted therein;

FIG. 3 shows an example of the detector arrangement of the present invention and a schematic diagram of the switching circuit used in connection therewith;

DETAILED DESCRIPTION OF THE PREFERRED EMBODIMENTS

Figure 4:
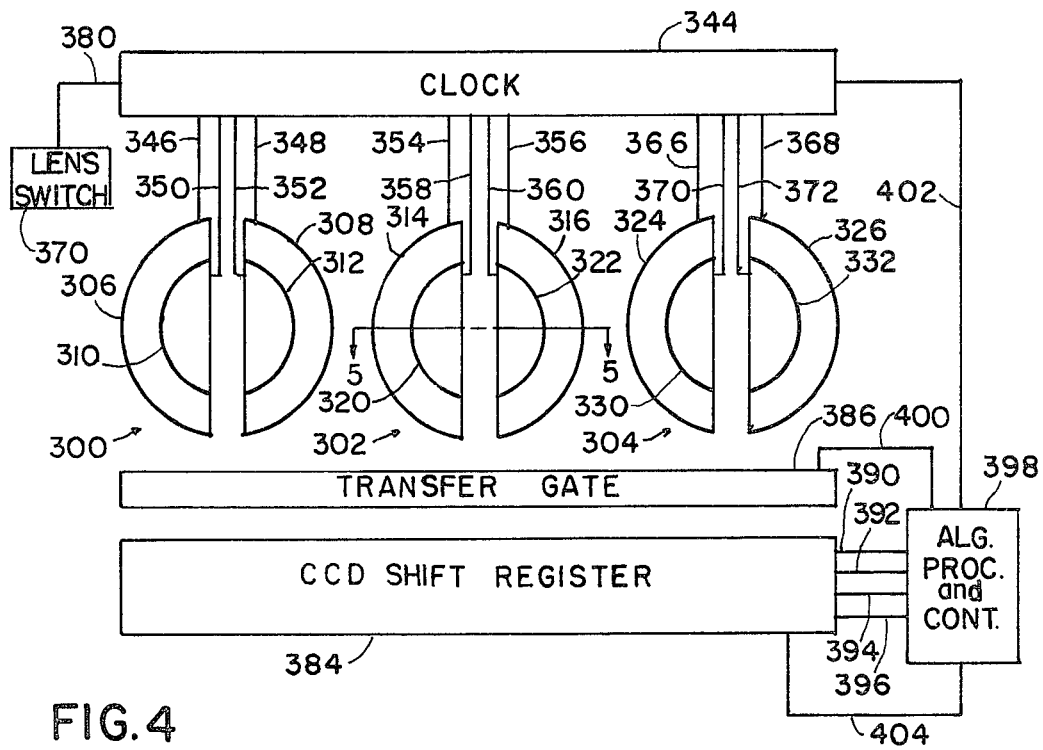
FIG. 4 shows a schematic diagram of an alternate embodiment of the present invention.

In FIG. 1, a lens 10, representing the objective lens of an optical system or the taking lens of a camera, is shown having an axis 12 along which lens 10 is moveable in the direction shown by arrows 14. Lens 10 receives radiation from a scene being viewed at the left in FIG. 1 and directs this radiation towards the right to a lenslet array 16 mounted proximate the image plane of lens 10. Radiation from the lens 10 is shown being directed to the lenslet array along paths such as is shown by dashed lines 20 and 22. Lenslet array 16 is shown having a right-hand surface composed of a plurality of lenslets such as those identified by reference numeral 26 and behind each lenslet to the right are a pair of dots representing radiation sensitive detectors such as are identified by reference numeral 28. The lenslets may be spherical so as to produce circular images or may be cylindrical as is shown in the above-referred to copending application Ser. No. 23,866 to produce oblong images of the exit pupil of objective lens 10. The left-hand surface 32 of lenslet array 16 is shown to be flat, but a corrector lens arrangement such as is shown in the above-referred to copending application Ser. No. 23,865, may be used so that the detectors at the ends of the array may receive radiation in more equal amounts from the end lenslets when the objective lens $1\phi$ is in the proper focus position. As lens 10 moves along axis 12 out of a proper focus position, the radiation received by the individual detectors associated with each lenslet will change and analyzing circuitry described in the above-referred to copending applications Ser. No. 912,688 and Ser. No. 16,595, is connected to the detector so as to produce a signal indicative of the direction which lens 10 must be moved to achieve a proper focus position. This signal may either be used for indicating the out-of-focus condition or to drive a motive means so as to reposition lens 10 at the proper focus position.

FIG. 2 shows an enlargement of one of the images of the exit pupil of lens 10 produced by one of the lenslets of FIG. 1 which image is represented as circular and identified by dashed line 40. While 40 is shown to be circular, as mentioned above, it may be oblong if other types of lenslets are utilized. In FIG. 2, a pair of rectangular detectors 42 and 44 are shown mounted within image 40 so that each will receive substantially the same radiation when objective lens 10 is in a proper focus position. While the rectangular configuration is easiest to produce, other shaped detectors such as rectangles with their corners removed or even semicircular detectors may be employed. It is also seen in FIG. 2 that the detectors are as large in size as possible to maximize output signals but small enough to just fit entirely within the image at all times. If the image were to be smaller than that shown in FIG. 2, the output of the detectors would decrease since they would receive less radiation and unless the detectors were positioned with almost unattainable accuracy, the amount of decrease in output of detector 42 would be different than that of detector 44 which might cause a false indication of an in-focus condition. Image 4φ is of a size which depends upon the maximum aperture of lens 10 and accordingly, detectors 42 and 44 must be of a size sufficient to fit entirely within the image of the smallest of the lenses that may be used in the system normally f/2.8. Image 40 will be larger than is shown in FIG. 2 when lenses having smaller f numbers are used but as long as the detectors 42 and 44 fit entirely within the image, the false out-of-focus signal will not occur. Of course, smaller detectors may be employed to accommodate larger f numbers but then a smaller detector output signal would be available with the normal objective lenses and the reduced optical base of the system will limit the accuracy of focus which can be achieved.

FIG. 3 shows a system wherein two sizes of detectors may be employed thus increasing the ability of the optical system to operate using lenses with larger f numbers. In FIG. 3, an image which might be produced by an f/1.4 lens is shown by a dashed line circle 50, the image which might be produced by an f/2.8 lens is shown by a dashed line circle 52 and the image which might be produced by an f/4 lens is shown by a dashed line circle 54. Mounted within the images 50 and 52 are a first pair of detectors 6φ and 62 and mounted within the image 54 is a second set of detectors 66 and 68. Detectors 60 and 62 are large enough to fit within the image produced by the largest f number objective lens normally employed, an f/2.8 lens in the example shown herein, while detectors 66 and 68 are smaller and sized so as to fit within the image produced by the more unusual f/4 lens. The smaller detectors 66 and 68 are defined by a layer of transparent conductive material and are shown partly superimposed on the larger detectors 60 and 62, for example, like the arrangement which will be described in connection with FIG. 4. With this arrangement, the larger detectors 6φ and 62 will receive radiation both directly and through the smaller detectors 66 and 68 so as to maximize their signal. Other similarly mounted large detectors, identified by reference numerals 70, 72, 74 and 76 and smaller detectors, identified by reference numerals 80, 82, 84 and 86, are shown in FIG. 3 but while only three sets of detectors are shown for simplicity, in a normal auto focus system there would be a considerably larger number of detector sets used.

The outputs of detectors 70, 72, 74, 76, 80, 82, 84 and 86 are shown connected by leads 90, 92, 94, 96, 98, 100, 102 and 104 to switch circuits identified by boxes bearing reference numerals 110 and 112. Switch circuit 110 has two input conductors 120 and 122 connected to terminals 124 and 126 respectively. Conductors 120 and 122 are also shown connected to ground through resistors 128 and 130 respectively. A switch arm 136 connected to a source of positive potential 138 is shown moveable between terminals 124 and 126 by a mechanical connection shown as dashed line 14φ. Mechanical connection 140 is connected to the lens mounting mechanism of the optical system (not shown) so that when the lens having a maximum aperture less than f/2.8 is employed, switch arm 136 will be moved to a lower position contacting terminal 126 but when a lens having a maximum aperture in excess of f/2.8 is used, the mounting mechanism will operate to connect switch arm 136 to upper terminal 124 as shown in FIG. 3. This may be accomplished, for example, by having switch arm 136 normally spring biased to the lower position when lower f number objective lenses are used and having a pin mounted on the high f number lens structures which pushes switch arm 136 to the upper position as the lens is fastened to the camera housing. Circuits 110 and 112 operate to connect the larger pairs of detectors 70, 72 and 74, 76 into the focus detecting circuit whenever an f/1.4 to f/2.8 lens is used and operate to connect the smaller of the pairs of detectors 80, 82 and 84, 86 into the focus detecting circuit whenever a lens having a maximum aperture in below f/2.8 is used. The selection of the maximum f numbers to be employed with larger and smaller detectors is, of course, arbitrary and a matter of design choice.

Switch circuits 110 and 112 contain circuitry like that shown in an enlarged switch circuit identified by dash line box 150 in the lower middle portion of FIG. 3. The switching circuitry includes four field effect transistors identified by reference numerals 152, 154, 156 and 158. The gate terminals of transistors 152 and 154 are connected together by a common conductor 160 which is connected by a conductor 162 to a junction point 163. Terminal 163 is connected by a conductor 165 to the upper output of switch circuit 110 and will carry the positive voltage from terminal 138 whenever switch arm 136 is in the upward position contacting terminal 124. The positive potential on conductor 165 is presented by conductors 162 and 160 to the gate terminals of transistors 152 and 154 thereby turning them on. Whenever switch arm 136 is in the lower position contacting terminal 126, the positive potential is removed from conductor 165 and transistor 152 and 154 are turned off.

The gate terminals of transistors 156 and 158 are connected together by a conductor 170 which is connected by a conductor 172 to a junction point 173. Terminal 173 is connected by a conductor 175 to the lower output terminal of switch circuit 110. Whenever switch arm 136 is in its lower position connected to terminal 126, the positive potential on terminal 138 is presented by conductors 175, 172 and 170 to the gate terminals of transistors 156 and 158 thereby turning them on. Whenever switch arm 136 is in its upper position, connected to terminal 124, the positive potential is removed from conductor 175 and transistors 156 and 158 will be turned off.

The output of the large detector 6φ is presented by way of a conductor 18φ to the source terminal of transistor 156 while the signal from large detector 62 is presented by way of a conductor 180 to the source terminal of transistor 158. Thus whenever the switch arm 136 is in its lower position, contacting terminal 126, transistors 156 and 158 will be turned on thereby presenting the signals on lines 18φ and 184 from the source terminals to the drain terminals of transistors 156 and 158 which are shown connected to lines 186 and 188 respectively. Line 186 is connected to a junction point 190 which emerges from switch circuit 150 on a conductor 192. Line 188 is connected to a junction point 194 which emerges from the switch circuit 150 on a conductor 196. The signals on conductors on 192 and 196, identified as "$A_2$" and "$B_2$" are presented to the focus sensing circuitry (not shown). In similar fashion, the signal from large detector 70 and 72 or from small detectors 80 and 82 will appear at terminals "$A_1$" and "$B_1$" of switch circuit 110 while the signals from large detectors 74 and 76 or from small detectors 84 and 86 will appear at terminals "$A_3$" and "$B_3$" of switch circuit 112.

The small detector 66, produces an output on a conductor 200 which is presented to the source terminal of transistor 152 while the output of small detector 68 is presented on a conductor 204 to the source terminal of transistor 154. Whenever switch arm 136 is in its upper position contacting terminal 124, transistors 152 and 154 will be turned on so that the signals on lines 200 and 204 will appear on the drain terminals of transistors 152 and 154 which are shown connected to lines 21φ and 212 respectively. Lines 210 and 212 are connected to junction points 190 and 194 respectively and thence by conductors 192 and 196 to the focus sensing circuitry (not shown). Junction points 163 and 173 are connected by conductors 220 and 222 to the upper and lower inputs of switch circuit 112 and the output conductors 224 and 226 of switch circuit 112 conduct the positive voltage on either line 120 or 122 which is passed through switch circuits 110, 150 and 112 onto the next switch circuit (not shown) and all other switch circuits which may be used in the system.

In operation, whenever the system is employing an f/2.8 lens or less, switch arm 136 will be in its lower position so that transistors 156 and 158 will be turned on while transistors 152 and 154 will be turned off. Under these circumstances, the larger detectors 60 and 62 will have their outputs connected to output conductors 192 and 196 for use by the auto focus circuitry but when a lens having an f number greater than 2.8 but less than 4.0 is used, switch arm 136 will be in the upper position shown in FIG. 3 and transistors 152 and 154 will be turned on while transistors 156 and 158 will be turned off. Under these circumstances, the outputs from the smaller detectors 66 and 68 will be connected to the output lines 192 and 196 for use by the auto focus circuitry.

All of the switching circuits 110, 150 and 112, as well as others not shown, will be switched at the same time upon operation of switch arm 136 so that in all cases when objective lenses with small f numbers are being employed, the outputs $A_1$, $B_1$ of switching circuit 11φ, $A_2$, $B_2$ of switching circuit 150 and $A_3$, $B_3$ of switching circuit 112 will carry the signals from the larger detectors thus producing a maximum amount of signal for use by the system. Whenever objective lenses with larger f numbers are employed, then the outputs $A_1$, $B_1$ of switching circuit 11φ, $A_2$, $B_2$ of switching circuit 150 and $A_3$, $B_3$ of switching circuit 112 will carry the signals produced by the smaller of the pairs of detectors thus providing an accurate, although smaller magnitude, signal for use by the system.

Figure 5:
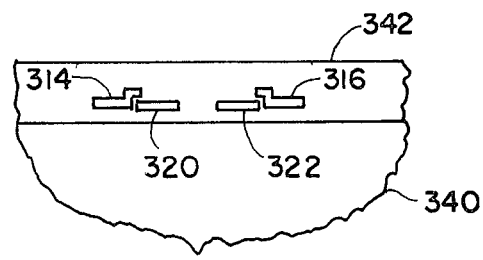
FIG. 5 shows a sectional view of one of the detector arrangements of FIG. 4.

As an alternate embodiment, a switching circuit may be employed which would combine the outputs of the large and small detectors whenever the f/1.4 to f/2.8 lenses are used but connect only the smaller of the detector outputs to the auto focus circuitry when lenses above f/2.8 are employed. For example, FIG. 4 shows three sets of detector arrangements generally referred to by reference numerals 300, 302 and 302 4 which may be like those of FIG. 3 except that they are shown to be constructed in a more or less circular fashion so as to more closely fit within the circular image projected upon them. Detector arrangement 300 is comprised of a pair of larger or outer detector electrodes 306 and 308 and a pair of smaller or inner detector electrodes 310 and 312. Detector arrangement 302 is comprised of a pair of larger or outer detector electrodes 314 and 316 and a pair of smaller or inner detector electrodes 320 and 322. Detector arrangement 304 is comprised of a pair of larger or outer detector electrodes 324 and 326 and a pair of smaller or inner detector electrodes 330 and 332. Each of the detector arrangements 300, 302 and 304 may be constructed as is shown in FIG. 5 which is a cross section of detector arrangement 302. There is shown a substrate 340, which may be silicon, and provided thereon is a layer of material 342 which may be silicon dioxide. Embedded within the silicon dioxide layer are the outer detector electrodes 314 and 316 of detector arrangement 302 in FIG. 4 and it is seen that these are constructed, in cross section, in an elongated "Z" shape which extends over the edges of the inner detector electrodes 320 and 322. These detector electrodes may be constructed of doped polysilicon and both the detector electrodes and the silicon dioxide material 342 are sufficiently transparent so that incoming radiation passes through the silicon dioxide layer 342 and the detector electrodes 314, 316, 320 and 322 to strike silicon substrate 340.

Referring again to FIG. 4, outer detector electrodes 306 and 308 are shown connected to a clock 344 by leads 346 amd 348 while smaller detectors 310 and 312 are connected to clock 344 by leads 350 and 352. In similar fashion, the larger detector electrodes 314 and 316 are connected to clock 344 by leads 354 and 356 respectively while smaller detector electrodes 320 and 322 are connected to clock 344 by leads 358 and 360. Likewise, larger detector electrodes 324 and 326 are connected to clock 344 by leads 366 and 368 respectively while smaller detector electrodes 330 and 332 are connected to clock 344 by leads 370 and 372 respectively. The lens switch, shown in FIG. 4 as a box 370, and which may be like the switch of FIG. 3, is shown connected to clock 344 by a lead 380.

The charges accumulated in each of the detectors of FIG. 4, due to incident radiation, are transferred periodically to a charge-coupled device (CCD) shift register 384 by a transfer gate 386. The transfer is accomplished by clocking, via voltage pulses, the transfer gate and the appropriate portions of the shift register compatibly with the detector electrodes to periodically transfer the accumulated changes under the detector electrodes in each detector arrangement pair, due to incident radiation, into corresponding shift register portions. Further clocking of the shift register 384 transfers these charges onto output leads 390, 392, 394 and 396 each representing the radiation intensity on a pair member from one of two detector arrangement pairs. Leads 390, 392, 394 and 396 are shown connected to an Algorithm Processor and control circuit identified by reference numeral 398 and which may be like that shown in the above-mentioned copending application Ser. No. 16,595, filed Mar. 1, 1979. Algorithm Processor and control 398 has a first output on line 400 connected to transfer gate 386 and a second output on a line 402 connected to clock 344 and a third output on line or lines 404 connected to shift register 384 so as to control the transfer rate of charges to the shift register 384. The line (or lines) 404 may also be used to control the shifting of charges along the shift register 384 towards the output on lines 390, 392, 394 and 396. The second output from the Algorithm Processor and control 398 on line 402 connected to the clock 344 operates to control the synchronizing of detector electrode energization with transfer of charges.

The choice of period duration between transfers of the accumulated charges, due to incident radiation, from the detectors to the shift register will strongly affect the average amount of such charges transferred for a particular illumination level. For example, with a very bright image, the period duration may be adjusted to be relatively small while for dimmer images, the period duration may be adjusted to be relatively long. This adjustment can be based on a comparison in the Algorithm Processor and control circuit of a reference value to either the average charge found in the shift register or the peak charge found in one of the various portions thereof. This allows the system to be employed in a great variety of radiation intensity situations.

When a lens having a larger aperture is employed, lens switch 370 causes the clock 344 to produce signals to all of the detectors 306, 308, 310, 312, 314, 316, 320, 322, 324, 326, 330 and 332 so that the entire area of illumination, falling on the detector arrangements, is being detected during the detection periods by both the larger and smaller detectors of each pair. The resulting detected charges are transferred through transfer gate 386 to shift register 384 to produce outputs on leads 390, 392, 394 and 396 for use by the system shown in the above-referred to copending application Ser. No. 16,595. When a lens with a smaller aperture is employed, then the lens switch 370 causes the clock 344 to produce signals to only the smaller detectors 310, 312, 320, 322, 330 and 322. Thereafter, during each detection period, only the radiation striking the smaller detectors will lead to charges to be transferred by transfer gate 384 into shift register 386 for use by the system.

It is thus seen that I have provided a detector system which may be used with various sized lenses without producing possible false signals due to detector misalignment. Many modifications and changes will occur to those skilled in the art as, for example, alternate switching arrangements and alternate detector configurations. It should be understood that while I have shown detectors such as 80 and 82 to be transparent and mounted over a portion of the detectors such as 70 and 72 so as to lie within the same exit pupil image, they do not necessarily have to overlap and it is possible to utilize a plurality of sets of lenslets like those shown herein so that different sets of exit pupil images are formed in different locations. Under these circumstances, the small detectors may be located within one set of images while the large detectors may be located within the other. In connection with FIGS. 4 and 5, it is also possible to mount other detector arrangements on the opposite side of substrate 340 and utilize the same substrate for all detector arrangements. This also permits spacing of individual detector arrangements closer together than is possible with the set of detector arrangements being all on one side as is shown in FIG. 4.

Accordingly, I do not wish to be limited by the specific descriptions used in connection with the preferred embodiments disclosed but intend only to be limited by the scope of the appended claims.

The embodiments of the invention in which an exclusive property or right is claimed are defined as follows:

1. A detector arrangement for use with an optical system including;
    an objective lens for producing an image of a remote scene at a first image plane;
    a plurality of lenslets mounted proximate the first image plane for producing a plurality of images of the exit pupil of the objective lens at a second image plane, the image of the exit pupil having a first size when the objective lens is of a first f number and a second size when the objective lens is of a second f number; and
    a first and second plurality of pairs of detectors mounted proximate the second image plane, the size of the first plurality of pairs of detectors being chosen so that the radiation sensing portion of each pair may closely fit entirely within a different one of the images of the exit pupil of the first size and the size of the second plurality of pairs of detectors being chosen so that the radiation sensing portion of each pair may closely fit entirely within a different one of the images of the exit pupil of the second size.

2. Apparatus according to claim 1 wherein each of the individual detector pairs of the second plurality of pairs of detectors is mounted contiguous a different one of the individual detector pairs of the first plurality of pairs of detectors.

3. Apparatus according to claim 2 wherein contiguous mounting provides at least a partial overlap of the individual detectors of the second plurality of pairs of detectors with the first plurality of pairs of detectors.

4. Apparatus according to claim 3 wherein the detectors of the second plurality of pairs of detectors are comprised of radiation transmissive material.

5. Apparatus according to claim 1 wherein each detector produces an output signal indicative of the amount of radiation received thereby, further including output means provided to receive the output signals and switch means operable in a first condition to connect the first plurality of detector pairs to the output means and in a second condition to connect the second plurality of detector pairs to the output means.

6. Apparatus according to claim 5 wherein the switch means is changed from the first condition to the second condition upon a change in the objective lens from the first f number to the second f number.

7. Apparatus according to claim 1 wherein the first and second plurality of detector pairs comprise a substrate of a semiconductor material, a layer of dielectric material thereon and detector electrodes embedded in the dielectric layer of material, each detector being operable upon energization to produce charges in the substrate in accordance with the intensity of radiation received thereby.

8. Apparatus according to claim 7 including a shift register formed in part in the substrate which has an output and which has inputs corresponding to members of the detector pairs in the first and second plurality thereof, the apparatus further including a transfer gate operable to transfer the charges produced in the detectors to the inputs of the shift register so as to permit signals at the output, upon appropriate shifting functions occurring in the shift register, which signals are indicative of the intensity of radiation received by selected detector electrodes.

9. Apparatus according to claim 8 including control means operable to produce voltage pulses and means connecting the control means to energize the detector electrodes, the transfer gate and the shift register, the control means and connecting means being operable to periodically transfer the charges produced in the detectors to the corresponding shift register inputs.

10. Apparatus according to claim 9 including means for determining an indication of the charge quantity in the shift register after a transfer of charge thereto, and for adjusting the duration of the period between such transfers in accordance, with a comparison of the charge quantity transferred with a reference indicating the desired quantity of charge in the shift register following a charge transfer.

11. Apparatus according to claim 10 including a lens switch connected to the control means and operable in a first condition to cause the voltage pulses to energize the first plurality of pairs of detectors and in a second condition to energize the second plurality of detectors.

12. Apparatus according to claim 1 including a shift register which has an output and which has inputs corresponding to members of the detector pairs in the first and second plurality thereof, the apparatus further including transfer means operable to transfer the charges produced in the detectors to the inputs of the shift register so as to permit signals at the output, upon appropriate shifting functions occurring in the shift register, which signals are indicative of the intensity of radiation received by selected detector electrodes.

13. Apparatus according to claim 12 including control means operable to produce voltage pulses and means connecting the control means to energize the detector electrodes, the transfer gate and the shift register, the control means and connecting means being operable to periodically transfer the charges produced in the detectors to the corresponding shift register inputs.

14. Apparatus according to claim 13 including means for determining an indication of the charge quantity in the shift register after a transfer of charge thereto, and for adjusting the duration of the period between such transfers in accordance with a comparison of the charge quantity transferred with a reference indicating the desired quantity of charge in the shift register following a charge transfer.

15. Apparatus according to claim 14 including a lens switch connected to the control means and operable in a first condition to cause the voltage pulses to energize the first plurality of pairs of detectors in a second condition to energize the second plurality of detectors.

16. In apparatus for use in a range determination system adapted to employ a first objective lens having an f number equal to or less than a predetermined value and a second objective lens having an f number greater than the predetermined value, the apparatus including a lenslet array mounted to receive radiation from the first or second objective lens to produce a first plurality of images of the exit pupil of the first objective lens or a second plurality of images of the exit pupil of the second objective lens the improvement comprising:

a first set of radiation detector pairs with each pair being mounted to receive radiation entirely within a different one of the first plurality of images;

a second set of radiation detector pairs with each pair being mounted to receive radiation entirely within a different one of the second plurality of images; and switching means operable when the first objective lens is employed to connect the first set of detector pairs to the range determination system and operable when the second objective lens is employed to connect the second set of detector pairs to the range determination system.

17. Apparatus according to claim 16 wherein the first and second sets of detector pairs are mounted contiguous one another.

18. Apparatus according to claim 17 wherein the second plurality of detector pairs overlap the first set of detector pairs.

19. Apparatus according to claim 18 wherein the second set of detector pairs are constructed of a radiation transmissive material.

* * * * *